(12) United States Patent
van Zwol et al.

(10) Patent No.: US 9,020,244 B2
(45) Date of Patent: Apr. 28, 2015

(54) RANKING AND SELECTING REPRESENTATIVE VIDEO IMAGES

(75) Inventors: Roelof van Zwol, Sunnyvale, CA (US); Lluis Garcia Pueyo, San Francisco, CA (US)

(73) Assignee: Yahoo! Inc., Sunnyvale, CA (US)

( * ) Notice: Subject to any disclaimer, the term of this patent is extended or adjusted under 35 U.S.C. 154(b) by 555 days.

(21) Appl. No.: 13/312,558

(22) Filed: Dec. 6, 2011

(65) Prior Publication Data

US 2013/0142418 A1    Jun. 6, 2013

(51) Int. Cl.
*G06K 9/62* (2006.01)
*G06K 9/00* (2006.01)

(52) U.S. Cl.
CPC ............................... *G06K 9/00751* (2013.01)

(58) Field of Classification Search
CPC ..................... G06K 9/00744; G06K 9/00751
USPC ............ 382/155–160, 305; 348/222.1, 231.2, 348/700, 701; 725/41
See application file for complete search history.

(56) References Cited

U.S. PATENT DOCUMENTS

| | | | | |
|---|---|---|---|---|
| 6,711,587 | B1* | 3/2004 | Dufaux | 1/1 |
| 7,545,985 | B2* | 6/2009 | Zhang et al. | 382/224 |
| 7,826,657 | B2* | 11/2010 | Zhang et al. | 382/162 |
| 8,139,099 | B2* | 3/2012 | Nelson | 348/14.08 |
| 8,280,158 | B2* | 10/2012 | Adcock et al. | 382/165 |
| 2002/0041339 | A1* | 4/2002 | Diepold | 348/700 |
| 2005/0180730 | A1* | 8/2005 | Huh et al. | 386/52 |
| 2006/0147107 | A1* | 7/2006 | Zhang et al. | 382/159 |
| 2009/0007202 | A1* | 1/2009 | Williams et al. | 725/105 |
| 2009/0079840 | A1* | 3/2009 | Gandhi et al. | 348/222.1 |
| 2009/0265737 | A1* | 10/2009 | Issa et al. | 725/38 |
| 2011/0081075 | A1* | 4/2011 | Adcock et al. | 382/165 |
| 2011/0264641 | A1* | 10/2011 | Yang et al. | 707/706 |
| 2012/0033949 | A1* | 2/2012 | Lu et al. | 386/285 |
| 2012/0123780 | A1* | 5/2012 | Gao et al. | 704/245 |
| 2012/0148157 | A1* | 6/2012 | Kumar et al. | 382/173 |
| 2013/0016243 | A1* | 1/2013 | Foote | 348/222.1 |
| 2013/0142418 | A1* | 6/2013 | van Zwol et al. | 382/159 |

OTHER PUBLICATIONS

Jerome H. Friedman, "Stochastic Gradient Boosting", Mar. 26, 1999.*

Agarwal, D. et al., "Explore/Exploit Schemes for Web Content Optimization," *IEEE International Conference on Data Mining*, 0:1-10, 2009 (10 pages).

(Continued)

*Primary Examiner* — Aaron W Carter
(74) *Attorney, Agent, or Firm* — Hickman Palermo Becker Bingham LLP; Edward A. Becker

(57) ABSTRACT

Techniques are described herein for selecting representative images for video items using a trained machine learning engine. A training set is fed to a machine learning engine. The training set includes, for each image in the training set, input parameter values and an externally-generated score. Once a machine learning model has been generated based on the training set, input parameters for unscored images are fed to the trained machine learning engine. Based on the machine learning model, the trained machine learning engine generates scores for the images. To select a representative image for a particular video item, candidate images for that particular video item may be ranked based on their scores, and the candidate image with the top score may be selected as the representative image for the video item.

20 Claims, 6 Drawing Sheets

(56) References Cited

OTHER PUBLICATIONS

Canny, J., "A Computational Approach to Edge Detection" Pattern Analysis and Machine Intelligence, *IEEE Transactions on PAMI*—8(6):679-698, Nov. 1986.

Friedman, J. Greedy function approximation: A gradient boosting machine. *Annals of Statistics*, 29:1189-1232, 2001.

Hasler, D. et al., "Measuring colorfulness in natural images," In B. E. Rogowitz et al., editors, Human Vision and Electronic Imaging VIII, vol. 5007, pp. 87-95, Santa Clara, CA, USA, Jun. 2003, *SPIE*.

Huang, K. et al., "Natural color image enhancement and evaluation algorithm based on human visual system" *Computer Vision and Image Understanding*, 103(1):52-63, Jul. 2006.

Lienhart, R., "Comparison of automatic shot boundary detection algorithms" In M. M. Yeung et al., editor, *Society of Photo-Optical Instrumentation Engineers* (SPIE) Conference Series, vol. 3656 of Society of Photo-Optical Instrumentation Engineers (SPIE) Conference Series, pp. 290-301, Dec. 1998.

Pedro, J. et al., Ranking and classifying attractiveness of photos in folksonomies. In *WWW*, Madrid, Spain, Apr. 2009 (10 pages).

Ye, J. et al., "Stochastic gradient boosted distributed decision trees." In CIKM '09: Proceeding of the $18^{th}$ ACM conference on Information and knowledge management, pp. 2061-2064, New York, NY, USA, 2009. *ACM*.

Zabih, R. et al., "Feature-based algorithms for detecting and classifying scene breaks." Technical report, Ithaca, NY, USA, 1995 (35 pages).

Zheng, Z. et al., "A regression framework for learning ranking functions using relative relevance judgments." In SIGIR '07, pp. 287-294, New York, NY, USA, 2007. *ACM*.

* cited by examiner

| FrameID | GBDT Score | Judgement | Frame |
|---|---|---|---|
| 948 | 0.66014188528061 | 3 | |
| 2021 | 0.55803447961807 | 2 | |
| 3799 | 0.50344580411911 | 2 | |
| 3 | 0.48838728666306 | 1 | |
| 3095 | 0.44346851110458 | 1 | |
| 303 | 0.24876140058041 | 0 | |
| 94 | 0.14282999932766 | 0 | |
| 76 | 0.03003330156307 | 0 | |

FIG. 4

RANKING AND SELECTING REPRESENTATIVE VIDEO IMAGES

FIELD OF THE INVENTION

The present invention relates to digital video items and, more specifically, to selecting which image(s) to use to represent digital video items.

BACKGROUND

It has becoming increasingly important for users to able to find digital video items, such as video clips and movies, in which they are interested. However, due to the visual nature of digital video items, searching for digital video items of interest tends to be more difficult than searching for textual items of interest, such as documents.

Many popular search video sites on the Internet present search interfaces that allow a user to obtain a set of potentially-interesting video items based on a keyword search against metadata, such as video titles. Once the set of potentially-interesting video items has been obtained, the user is presented with an interface designed to help the user decide which of the potentially-interesting videos will actually be most interesting to the user. An example of such an interface is depicted in FIG. 1, where for every single video search result, part of its metadata (title, description, duration) and a representative image are shown.

Referring to FIG. 1, it depicts three images that correspond to the top three videos for the query "new york". Adjacent to each image is metadata relating to the corresponding video, including the title of the video. Below the listing of the top three search results are two additional images. These two additional images are hand-picked frames from the video listed in the top ranked search result.

While the metadata information about the videos may help the user to select the result in which the user is interested, research on saliency has shown that images are important eye-catchers. The image by which a video is represented within the search results is intended to give a direct preview of what the video is about. Consequently, selecting the most representative and engaging image is essential to drive the user video consumption. The images depicted in FIG. 1 are examples of how badly-selected images may reduce video consumption. Specifically, the images shown for the top three search results are identical, and convey nothing about the specific content of the video.

Typical videos are encoded with frame rates equal to or higher than 15 frames per second, which means that for a relatively short video of 30 seconds, 450 images are candidates to represent it. Publishers currently use a variety of techniques to select these images. For example, in some cases, the frame that is used as an image to represent the video (the "representative image") is manually selected by an editor. Unfortunately, while editors may be able to select the frames that would appeal to the greatest percentage of users, editor-executed selection is time-consuming and cannot easily be scaled to large volume situations.

To avoid the costs associated with manual selection, some publishers choose one frame at random from the whole duration of the video. However, a randomly-selected frame has a relatively low likelihood of being interesting to users.

Rather than select a frame randomly, the frame at a predetermined offset may be selected (e.g. the frame that is 15% into the video). To select a frame at a particular offset, the frame extraction process may be embedded in the video encoding process. Specifically, while encoding a video, the encoder determines the length of the video, and the image at the determined video offset is extracted and included as part of the asset meta-data. Selecting frames at pre-defined offsets may yield better results on average than a totally random selection, but may still result in the selection of non-representative, uninformative and/or uninteresting frames.

Another technique is to use, as the representative image, an external image that identifies a generic concept related to the video (such as the provider logo). Such a technique may further other goals, such as increasing the market's awareness of a publisher, but is not likely to entice a user to watch the particular video with which the external image is used.

To avoid the cost of manual selection, and yet achieve better results than random selection or external images, some techniques have been developed for selecting a frame based on some characteristic of the image in the frame. For example, U.S. Pat. No. 7,826,657 describes a technique for selecting a representative image based on color characteristics of the images. Techniques that use a specific characteristic as the basis for selecting a representative frame for a video yield good results when the characteristic proves to be a good indicator of "quality" or "representativeness". However, it is unlikely that any characteristic will prove to be a good indicator of which frames are best to represent all videos, to all users, in all situations.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIG. 4 is a block diagram illustrating candidate images that have been ranked based on model-generated scores, according to an embodiment of the invention;

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are described herein for selecting representative images for video items using a trained machine learning engine. Specifically, a machine learning model is generated by feeding a training set to a machine learning engine. The training set includes, for each image in the training set, input parameter values and an externally-generated score. Once a machine learning model has been generated based on the training set, input parameters for unscored images are fed to the trained machine learning engine. Based on the machine learning model, the trained machine learning engine generates model-generated scores for the images. To select a representative image for a particular video item, candidate images for that particular video item may be ranked based on their model-generated scores, and the candidate image with the top model-generated score may be selected as the representative image for the video item.

Rather than using the same image to represent a video to all users in all situations, the input parameters used to score the images may include parameters that result in different scores for the same image, based on other factors that are external to the video itself. For example, one factor may be the target audience to which the representative image will be displayed. In an embodiment where the target audience is a factor for selecting the representative image, the input parameters used by the machine learning engine include target-specific input parameters. Such parameters may include, for example, demographic information about a target user, preference information previously provided by the target user, and/or usage information obtained by monitoring the target user's prior behavior (e.g. which web sites the user visited, which search results the user selected in the past, etc.) By using target-specific information as input when both training and scoring with the machine learning engine, the model-generated scores for a particular image of a particular video may vary from target audience to target audience.

As shall be described in greater detail hereafter, the input parameters used by the machine learning engine may take into account any number of additional factors beyond the image and video item themselves, thereby producing different scores for the same image of the same video item based on those other factors.

Training and Scoring Phases

Figure 3:
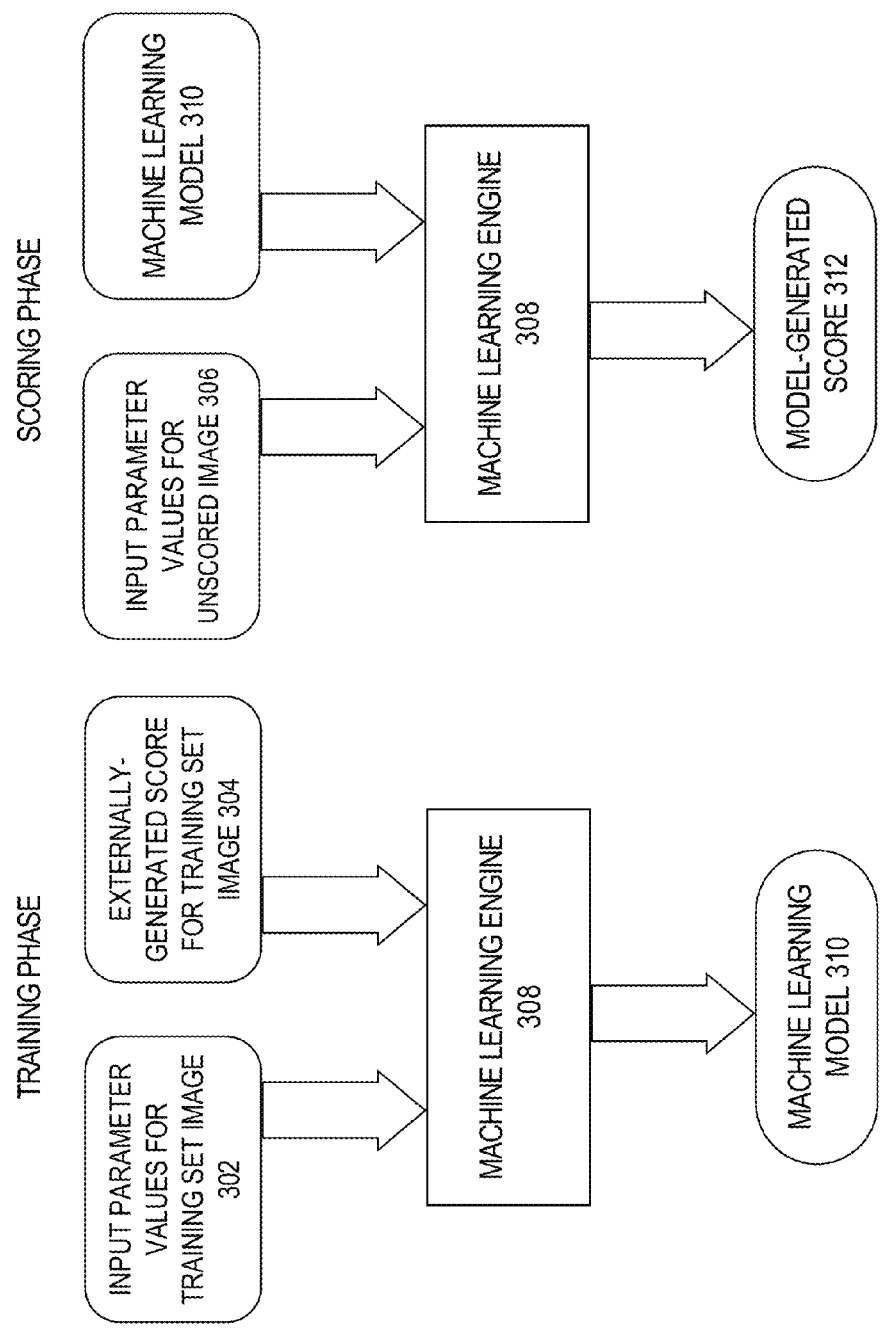
FIG. 3 is a block diagram illustrating a training phase and a scoring phase of a system that employs a machine learning engine to select a representative image, according to an embodiment of the invention.

FIG. 3 is a block diagram generally depicting the training and scoring phases of a machine learning engine 308. During the training phase, the machine learning engine 308 goes through a series of training operations. During each training operation, the machine learning engine 308 is fed an externally-generated score, and a set of input parameter values associated with the score. The externally-generated score associated with a set of input parameter values is the score that the machine learning engine should generate when fed the associated set of input parameter values.

The externally-generated scores may have been produced by any scoring mechanism, and are intended to represent the "correct score" for the associated set of input parameter values. For example, an editor may manually assign quality scores 0.9, 0.3, 0.5 respectively to three images A, B and C from a video item X. During the training phase, one training operation would involve feeding machine learning engine 308 the input parameter values for image A and video item X, along with externally-generated score 0.9. Another training operation would involve feeding machine learning engine 308 the input parameter values for image B and video item X, along with externally-generated score 0.3. Yet another training operation would involve feeding machine learning engine 308 the input parameter values for image C and video item X, along with externally-generated score 0.5.

In the example given above, only one training operation is performed for each candidate image, because the input parameter values did not include factors external to the image and video itself. However, in embodiments where some of the input parameters relate to external factors, such as characteristics of the target user, a single image/video item combination may require multiple training operations. For example, image A of video item X may have an externally-generated score of 0.9 for a user with a first set of preferences, an externally-generated score of 0.5 for a user with a second set of preferences, and a score of 0.1 for a user with a third set of preferences. In these circumstances, three training operations would be performed for image A of video item X, during which both the user-specific input-parameter values and the externally-generated score would change from operation to operation.

During the scoring phase, input parameter values for each of a plurality of candidate images are fed into machine learning engine 308. As with the parameters used to train the machine learning engine, the parameters used during the scoring phase may include parameters associated with factors that are external to the image and video itself. Based on the machine learning model 310 that was built during the training phase, machine learning engine 308 generates a model-generated score 312 for each of the candidate images. Once all candidate images have been scored, the images may be ranked based on the model-generated scores, and one or more of the highest ranking images may be selected as the representative image(s) for the video.

Selecting Candidate Images

Prior to using machine learning engine 308 to predict which images are most representative for a given video, candidate images are selected from the video. In theory, any frame can be a candidate image, but in practice it may be too expensive to evaluate each frame individually.

According to one embodiment, candidate frames are selected using a scene selection mechanism. Specifically, the boundaries between scenes within a video are identified, and one or more frames are selected from within each scene. Any one of a variety of scene boundary identification techniques may be used, including but not limited to those described in R. Zabih, J. Miller, and K. Mai. Feature-Based algorithms for detecting and classifying scene breaks (Technical report, Ithaca, N.Y., USA, 1995) and R. W. Lienhart. Comparison of automatic shot boundary detection algorithms. In M. M. Yeung, B.-L. Yeo, & C. A. Bouman, editor, Society of Photo-Optical Instrumentation Engineers (SPIE) Conference Series, volume 3656 of Society of Photo-Optical Instrumentation Engineers (SPIE) Conference Series, pages 290-301, December 1998.

Specifically, in one embodiment, scenes are identified using the Edge Change Ratio method, which is defined as follows:

Let $\sigma_n$ be the number of edges in frame n, $X_n^{in}$ and $X_{n-1}^{out}$ the number of entering and exiting edge pixels in frames n and n−1, respectively. Then $$ECR_n = \max(X_n^{in}/\sigma_n, X_{n-1}^{out}/\sigma_{n-1})$$

gives the edge change ratio $ECR_n$ between frames n−1 and n. It ranges from 0 to 1. The edges may be calculated by the Canny edge detector described in J. Canny. A Computational Approach to Edge Detection. Pattern Analysis and Machine Intelligence, IEEE Transactions on, PAMI-8(6):679-698, November 1986. This method is proven to be robust against motion and allows for the detection of hard cuts and fades.

According to one embodiment, an ECR threshold of 0.025 is used, and scene changes with distances of a minimum of 10 frames are detected, to avoid having short scenes. In addition, edge pixels in one image which have edge pixels nearby in the other image (e.g. within 6 pixels distance) are not regarded as entering or exiting edge pixels.

As mentioned above, once scene boundaries are detected, one or more candidate images are selected from each scene. A variety of techniques may be used to determine which images, within each scene, to select as candidate images. For example, in one embodiment, the starting, middle and end frames for every scene are selected as candidate images.

Figure 1:
FIG. 1 is a block diagram depicting a typical interface for selecting a video item from search results that include multiple potentially-interesting video items.
Figure 2:
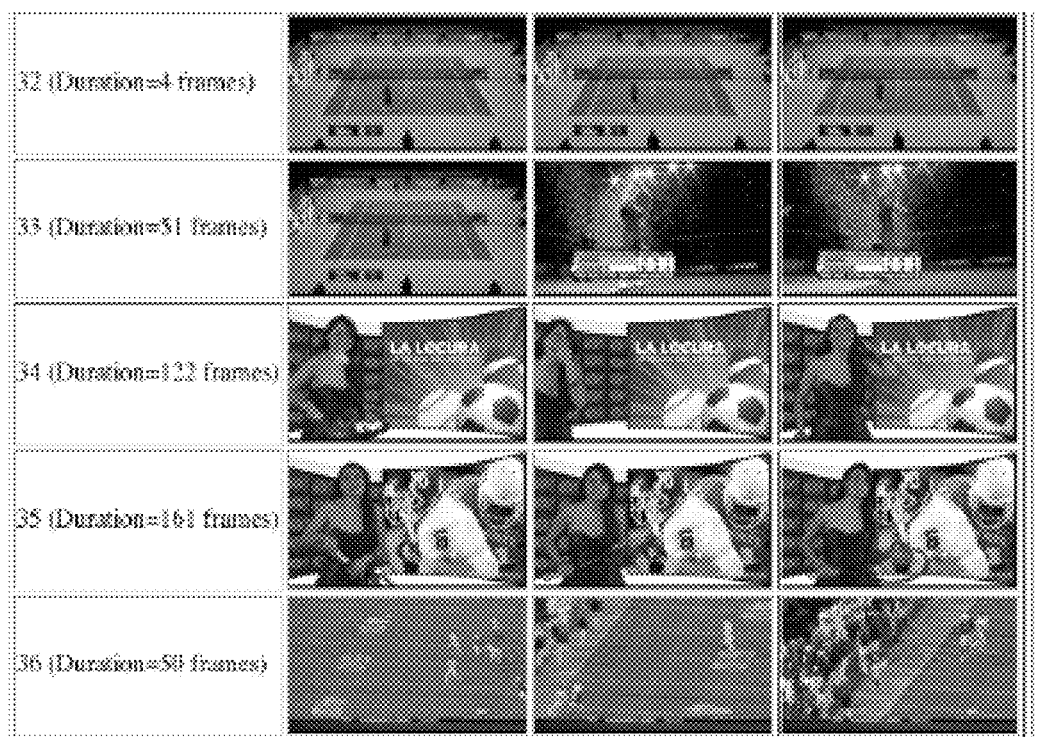
FIG. 2 is a block diagram illustrating candidate images selected from a video using a scene-based candidate image selection technique, according to an embodiment of the invention.

FIG. 2 is a block diagram illustrating the fifteen images that have been selected as candidate images for a particular video using the candidate selection technique described above. Specifically, each of the five rows illustrated in FIG. 2 corresponds to a distinct scene identified within the video. Each row includes three images that correspond to the first, middle and end of the scene that corresponds to the each.

Automated Selection Using Machine-Learning Engine

Once the candidate images have been extracted from the video, a trained machine learning engine is used to determine which images are most representative of the video. As mentioned above, the machine learning engine may be trained using parameters that take into account not only characteristics of the image and video from which the image was extracted, but any number of other factors that are external to the image and video itself.

Referring again to FIG. 3, automatic selection of a representative image is performed during the scoring phase by feeding parameter values 306 associated with each candidate image of a video into the machine learning engine 308. Based on the trained learning model 310 and the input parameter values 306 for an image, the machine learning engine 308 generates a model-generated score 312 for the image. FIG. 4 is a block diagram illustrating the scores that may be generated for eight candidate images.

Referring to FIG. 4, it depicts a table in which each row is associated with a candidate image from the same video item. The first column indicates the number of the frame, within the video item, of the candidate image of each row. The second column indicates the model-generated score (GBDT Score) 312 generated by the machine learning engine 308 for each image. The third column indicates how those scores map onto discrete judgment values 0-4, where 4 indicates a high quality or highly representative image, and 0 represents a low quality or unrepresentative image. In the example illustrated in FIG. 4, the frame with FrameID 948 has the highest model-generated score 312, and therefore would be selected as the representative image for the video.

Inputs into the Machine Learning Engine

According to one embodiment, the input parameter values used both in training and scoring include, but are not limited to, visual, temporal, contextual, and audio features that can be extracted from the raw video content, the candidate images, and the video context.

Visual features generally include features that reflect frame quality (e.g.: Sharpness, Contrast, Brightness) as well as high level pictorial characteristics, such as the number of faces or the degree of naturalness in the image. Visual features may also include any number of local features, or a function of local features. Local features include, but are not limited to, features identified using Speeded Up Robust Feature (SURF) or Scale-invariant Feature Transform (SIFT).

Temporal features are intended to capture how typical a candidate frame is with respect to its immediate neighboring frames, other frames in the same shot, the same video, or across the entire video collection. Using near-duplicate image detection techniques, and metrics that capture the frame-dynamics, values may be generated to express how representative a frame is for a given video in the collection.

Parameters that relate to the video context include the category of the video and video duration. These and other features that may be used as inputs into the machine-learning engine are discussed in greater detail hereafter.

The input parameters can also include parameters for various external features. Various types of external features shall also be described in greater detail hereafter.

The scope of the features reflected in the input parameters may vary from feature to feature. For example, some features are frame-specific, where each candidate image from a video will have a different value for the feature. The offset of a frame within a video is an example of a frame-specific feature.

Other features are scene-specific, where all candidate images within the same scene will have the same value for the feature, but candidate frames in other scenes will have different values for the feature. The topic of a scene is an example of a scene-specific feature.

Yet other features may be video-specific, where all candidate images in the video have the same value for the feature. The topic of a video, the creator of the video, and the duration of the video are all examples of video-specific features.

According to one embodiment, the features that are reflected in the input parameters that are fed to the machine learning engine may vary from video to video based on one or more factors. For example, in an embodiment where videos have been assigned to categories, the category to which a video has been assigned may determine the features that are reflected in the input parameters. Thus, the input parameters for "nature" videos may include a higher number of visual features than "news" videos, while the input parameters for "news" videos may include a higher number of contextual features than "nature" videos.

The Machine Learning Engine

Various types of machine learning tools may be used to implement the representative frame scoring and selection techniques described herein. While a specific embodiment shall be described hereafter in which Gradient Boosted Decision Trees are used as the machine learning engine, any machine learning tool may be used that is capable of producing model-generated scores for unscored images based on a trained machine learning model, where the machine learning model is built based on externally-generated scores assigned to a training set of images.

A stochastic gradient boosted decision tree (GBDT) is one of the most widely used learning algorithms in machine learning today. Gradient tree boosting constructs an additive regression model, utilizing decision trees as the weak learner, as described in J. H. Friedman. Greedy function approximation: A gradient boosting machine. Annals of Statistics, 29:1189-1232, 2001.

Using decision trees to implement the machine learning engine is useful in that the feature importance and models are highly interpretable. GBDT is also highly adaptable, and different loss functions can be used during boosting. According to one embodiment, least squares regression is used as the loss function. GBDT utilizing pairwise and ranking specific loss functions may performed well and improve search relevance.

Besides utilizing shallow decision trees, trees in stochastic GBDT may be trained on a randomly selected subset of the training data. Such trees are less prone to over-fitting.

Creating the Training Set

As mentioned above with reference to FIG. 3, the machine learning model 310 is built during a training phase as information from a training set is fed to machine learning engine 308. The training set establishes a "ground truth", which is used to train and evaluate the performance of the gradient-boosted decision trees.

To create the training set, candidate images are assigned scores by some mechanism external to the machine learning engine 308 itself. The mechanism may involve, for example, an interface that allows humans to manually assign scores to candidate frames. Such an interface is illustrated in FIG. 5.

Figure 5:
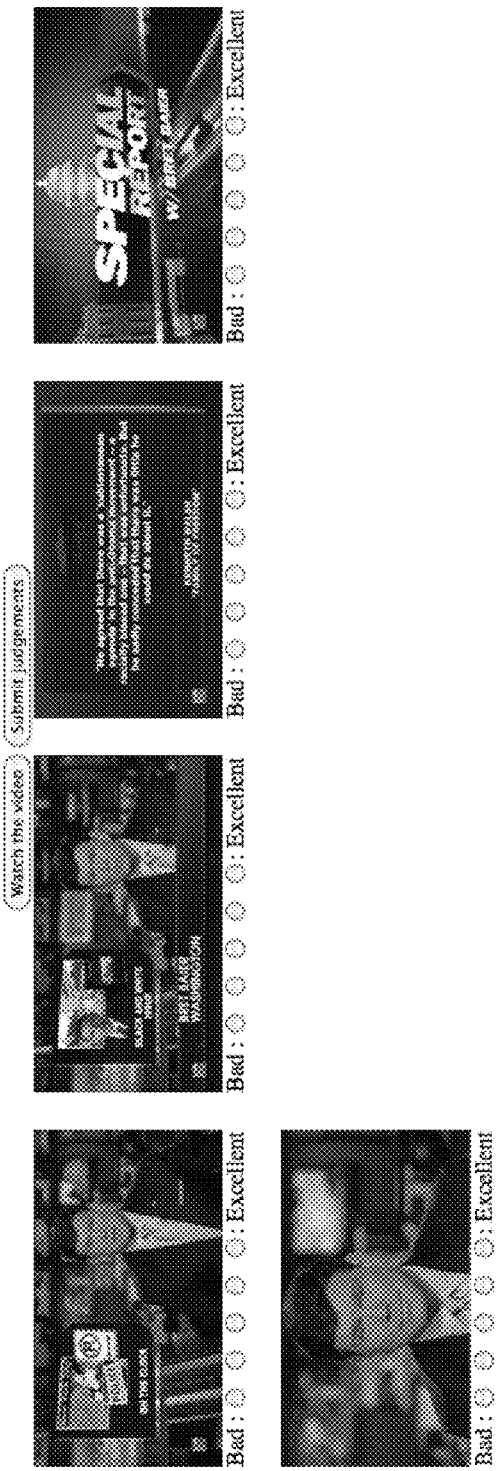
FIG. 5 is a block diagram of an interface that may be used during the training phase to assign externally-generated scores to candidate images, according to an embodiment of the invention.

Referring to FIG. 5, it is a block diagram that illustrates an interface for presenting images from a video to a user to allow the user to rate how representative the images are for the video. In the interface depicted in FIG. 5, a user is presented with controls for watching a video, rating five images of the video, and for submitting judgments. The rating controls allow a user to rate each of the five images on a five-point scale (bad-excellent). Preferably, the images that are included in the training set include images across the entire spectrum of highly-representative to non-representative.

According to one embodiment, when the "submit judgments" control is activated, the judgment assigned to each image is projected onto a scale of [0-1] using incremental steps of 0.25 to produce an externally-generated score 304. Each externally-generated score is stored in association with the input parameter values that are generated for the image to which the corresponding judgment was assigned. During the training phase, these externally-generated scores, along with the parameter values for the corresponding image, are fed to machine learning engine 308 to train the logistic regression function of gradient-boosted decision trees.

In the embodiment illustrated in FIG. 5, the externally-generated scores 304 are based on human-entered judgments. However, the actual mechanism used to generate the scores 304 by which the machine learning engine 308 is trained may vary from implementation to implementation. For example, externally-generated scores 304 may be automatically generated scores produced by a quality-measuring algorithm that is too computationally expensive to be used to determine the representative images for all videos. Such a computationally expensive algorithm may be used to generate relatively accurate scores for candidate images from a small fraction of the total number of videos in a collection. Those scores may be used to train the machine learning engine 308, and the trained machine learning engine 308 may then be used to generate representativeness scores for the remainder of the video collection.

Visual Features

As mentioned above, the input parameter values 302 used during the training phase, as well as the input parameter values 306 used during the scoring phase, may include values for features that capture the visual aesthetics and quality of images. Such features may include a set of low-dimensional image features that describe attributes that encapsulate the human perception of the photos, local features such as SURF or SIFT, and/or a set of higher dimension features like color histogram, edge directionality (CEDD), and other global image features.

In one embodiment, the visual features that are reflected in the input parameters include geometry features, contrast features, saturation, brightness, sharpness and colorfulness features, naturalness features, and texture features. Examples of how parameter values for each of these types of features may be generated are provided hereafter. However, the techniques described herein are not limited to any particular types of visual features, nor any particular manner of calculating parameter values for any particular type of visual feature.

Orientation

According to one embodiment, the orientation features included in the input parameters to the machine learning engine include an orientation feature and a size feature. The parameter value for the orientation feature indicates whether an image is laid out as a portrait or landscape. The parameter value for the size feature allows for differentiation between high resolution images taken with cameras of potentially higher quality, and images taken with smaller sized cameras or other mobile devices that may lack the lens, sensor and digital signal processing capabilities of the former.

Contrast Features

The input parameters to the machine learning engine may also include one or more contrast features. For example, in one embodiment, the input parameters include both a Contrast parameter and a normalized Root Mean Square (RMS) Contrast parameter. For the Contrast parameter, an HSL representation of the image is used to calculate the average distance between the luminance of each pixel $l_{x,y}$ of total N pixels and the average image luminance L:

$$C = \frac{1}{N} \sum_{x,y} (l_{x,y} - L)$$

RMS Contrast allows for easier comparison between independent images. According to one embodiment, $C_{RMS}$ is calculated by first calculating an, average normalized image luminance $\overline{L}$:

$$\overline{L} = \frac{1}{N} \sum_{x,y} \frac{l_{x,y} - l_{min}}{l_{max} - l_{min}}$$

$$C_{RMS} = \sqrt{\frac{1}{N} \sum_{x,y} (l_{x,y} - \overline{L})^2}$$

Saturation, Brightness, Sharpness and Colorfulness

In one embodiment, the saturation, brightness and colorfulness features describe the color characteristics of the image in terms of minimum, average, maximum and standard deviation of vividness and luminance, and a score for difference-from-grey respectively, thereby producing nine color-based features that may be used as input parameters to the machine learning engine.

Saturation is most easily calculated in a color space that uses it as one of coordinates to describe a shade—HSV for example. To save colorspace conversion, a saturation value may be calculated as:

$$Sa = \max(R,G,B) - \min(R,G,B)$$

where R, G and B are the color values in the sRGB color space.

The input parameter for brightness may be based on the average intensity of all the pixels in the image. Again, using a color space that encodes luminance directly, its calculation in the YUV colorspace is the mean over all pixels:

$$\overline{Y} = \frac{1}{N} \sum_{x,y} (Y_{xy})$$

where $Y_{xy}$ describes the luminance value for a pixel at coordinates x, y and N is the total number of pixels.

Sharpness measures the coarseness of the image and can be determined as a function of its Laplacian, using normalized local average luminance with respect to the surrounding pixels.

$$Sh = \sum_{x,y} \frac{L(x,y)}{\mu_{x,y}}$$

$$L(x,y) = \frac{\partial^2 I}{\partial x^2} + \frac{\partial^2 I}{\partial y^2}$$

where $\mu_{x,y}$ is the average luminance of the pixels around pixel of coordinates x,y.

Colorfulness, can be extracted in the sRGB color space using a derivative opponent color space defined as:

$$rg = R - G$$

$$yb = \frac{1}{2}(R + G) - B$$

Colorfulness is then calculated as:

$$Cf = \sigma_{rgyb} + 0.3 \cdot \mu_{rgyb}$$

$$\sigma_{rgyb} = \sqrt{\sigma_{rg}^2 + \sigma_{yb}^2}$$

$$\mu_{rgyb} = \sqrt{\mu_{rg}^2 + \mu_{yb}^2} \, .$$

Naturalness

The naturalness feature attempts to combine multiple aspects of the visual perception of an image including colorfulness and dynamic range into a single score. This score is made up of three constituent parts representing the proportion of pixels judged likely to be either skin, vegetation or sky.

Using the HSL colorspace, the pixels are first filtered for those that have values 20≤L≤80 and S>0.1. The remaining pixels are then grouped in three sets: Skin, Grass, and Sky.

The average saturation $\mu_S$ for each group is used to compute naturalness indexes for each group:

$$N_{Skin} = e^{-0.5\left(\frac{\mu_S^{Skin} - 0.70}{0.50}\right)^2}, \text{ if } 25 \leq \text{hue} \leq 70$$

$$N_{Grass} = e^{-0.5\left(\frac{\mu_S^{Grass} - 0.81}{0.50}\right)^2}, \text{ if } 95 \leq \text{hue} \leq 135$$

$$N_{Sky} = e^{-0.5\left(\frac{\mu_S^{Sky} - 0.40}{0.22}\right)^2}, \text{ if } 185 \leq \text{hue} \leq 260$$

These are then combined to form a score for the image's naturalness:

$$N = \sum_i \omega_i N_i, \, i \in \{\text{'Skin', 'Grass', 'Sky'}\}$$

where $w_i$ is the proportion of pixels in group i. According to one embodiment, the scores for each of the three pixel groups, as well as the overall naturalness score, are used as features for which input parameters are fed into the machine learning engine. In one embodiment, the proportions of each pixel type with respect to the total image pixels are also included, resulting in seven naturalness features.

Texture

According to one embodiment, Tamura features are used to characterize the texture of the image using coarseness, contrast and directionality, as described in the work of Tamura et al. Coarseness and contrast are represented as single numeric values whereas the directionality is a 16 bin histogram. In such an embodiment, 18 distinct input parameter values represent the texture of the image.

Temporal Features

Visual features are merely one category of features that may be represented in the input parameters that are fed into the machine learning engine. According to one embodiment, temporal features are also represented in the input parameters. Temporal features include, for example, frame absolute offset and frame relative offset. Specifically, in one embodiment, the absolute time within the video of the frame from which a candidate image is derived is computed as a floating point number, expressed in seconds. In addition, the distance in seconds (offset) to the previous candidate frame is also stored.

In one embodiment, the temporal features that are reflected in the input parameters also include shot duration. The shot duration of a candidate image is the duration of the shot from which the candidate image was extracted. In an embodiment that does not divide videos into scenes, the duration of a shot may be expressed as the distance of the previous candidate frame in number of frames. In embodiments that divide a video into scenes, for example by using ECR as the scene detection algorithm, the shot duration may be calculated as the total duration of the scene, in frames, from which the candidate image was extracted.

According to one embodiment, the temporal features that are reflected in the input parameters further include "near duplicates at distance". To detect near duplicates, the Multi-Dimensional Discrete Cosine Transform (DCT) method may be used. The candidate image is first grayscaled, and then converted to 8×8 pixel image. Then the DCT is applied over the 8×8 image. A 64-bit signature is then extracted that characterizes the image. Distance between two images is computed using the hamming distance between the signatures. Specifically, every feature consists of 5 values corresponding to the number of images at hamming distance lower than or equal to {1,5,10,15,20} of the given image. Three features are computed for each candidate frame: (1) distances with all frames in the same video, (2) distances with all the other candidate frames in the same video and (3) distances with all other candidates in the video collection, resulting on a total of 15 values.

Yet another temporal feature that may be reflected in the input parameter is referred to herein as "frame dynamics". Specifically, to capture the amount of change between two frames, the amount of pixels that change between them are computed. Given two images $I_A$ and $I_B$, the distance between them is computed as:

$$D = \frac{\left(\sum_x \sum_y I_A(x, y) \neq I_B(x, y)\right)}{(\text{width} * \text{height})}$$

Given a candidate frame at position n, the distance is calculated with respect to frames at position n+α, where α takes α value in the set: (−60, −45, −30, −15, −10, −5, −2, −1, 1, 2, 5, 10, 15, 30, 45, 60), resulting on a total of 16 values.

Contextual Features

Contextual features are features that reflect the context of a candidate image, or the context of the video as a whole. For example, contextual features may include:
  keywords or tags associated with the video
  keywords or tags associated with the specific portion or scene of the video in which the candidate image occurs
  text from the closed caption information included with the video
  text from the closed caption information associated with the specific portion or scene of the video in which the candidate image occurs
  the category to which the video was assigned
  topics automatically detected in the video using topic detection techniques
  the duration of the video For example, with respect to topics, the text of a video may be fed into a generative model, such as Latent Dirichlet Allocation (LDA), or a Probabilistic Latent Semantic Analysis (PLSA) mechanism, configured to categorize videos according to a set of unknown topics. For each of the topics, a score will be generated to indicate how relevant the video is to the topic. The scores thus generated may be fed into the machine learning engine, along with other input parameters, for candidate images from the video.

Audio Features

According to one embodiment, one or more of the input parameters reflect audio features. Audio features that are reflected in the input parameter values associated with each candidate image may include, but are not limited to:
  the pitch of the audio of the video at the point within the video that corresponds to the frame from which the candidate image is derived
  the volume of the audio of the video at the point within the video that corresponds to the frame from which the candidate image is derived Activity Features Activity features are features that relate to how users have interacted with a video. For example, there may be some portions of a popular video that users replay repeatedly. On the other hand, there may be other portions of the same video that users frequently skip over. As users interact with a video, the activity information about how users are interacting with portions of the video may be recorded. This information may be used as the basis for activity features that are included in the input parameter values for candidate images. For example, the input parameter values for a particular candidate image may include a value that reflects how frequently the frame that corresponds to the image was replayed by viewers, and a value that reflects how frequently the frame that corresponds to the image was skipped by viewers. A parameter value may also reflect how frequently users abandoned viewing the video prior to reaching the frame associated with candidate images.

Target-Specific Features

As mentioned above, within the same video, different candidate images may appeal to different target audiences. For example, the video of a newscast may include images of a football game, and images of a natural disaster. While images of the natural disaster may be more interesting to most viewers, football fans may find more interest in the football images.

To ensure that each target viewer is shown the representative image that is most interesting to that viewer, the input parameters may include values for any number of target-specific features. For example, the input parameters may include features that indicate:
  The age of the target
  A user group to which the target belongs
  The network connection speed of the target
  The hobbies or interests of the target
  The social network connections of the target
  Prior behavior of the target (e.g. web pages visited, items bought, links clicked, videos viewed, etc.)
  Prior behavior of others in the target's social network
  Prior behavior of others that have been determined to have similar interests to the target
  The geographic location of the target
  The income level of the target Request-Specific Features According to one embodiment, the input parameters also include values that represent circumstances surrounding the specific request that triggered the need to select a representative image for a video item. For example, when the representative image is being selected so that it may be included in a search results listing for a video search, the input parameters may include:
  The site from which the search was initiated
  The time of day at which the search was initiated
  Preferences specified in the search interface
  The specific terms that were used in the search Training Based on External Features Target-specific features and request-specific features are examples of "external" features that are independent of the candidate frame and video item. For the machine learning engine to take such features into account when scoring candidate images, those same parameters are also input during the training process. One way to provide those parameters during the training phase is to add to the interface illustrated in FIG. 5 controls for specifying values for the external features.

For example, a user may use controls on a candidate-image-rating interface to specify a particular age, a particular user group, and a particular income level. The user may then manually assign ratings to the candidate images using, for example, the controls illustrated in FIG. 5. When assigning the ratings, the user would take into account the external feature values that were specified. For example, if the external feature values indicate a sports fan, the user would rate sports-related images higher. On the other hand, if the external feature values indicate an animal lover, then the user would rate images of animals higher.

Because the external features affect the ratings that are assigned to candidate images during the training phase, the same set of candidate images may be rated multiple times, where each round of rating is associated with a different set of external feature values. For example, a user may rate the five candidate images illustrated in FIG. 5 from the perspective of a sports fan. After those judgments are submitted, the same user may be asked to rate the same five candidate images from the perspective of an animal lover. This process may be repeated any number of times.

In another embodiment, judges rate each set of candidate images only once, but the same set of candidate images are rated by a plurality of different judges. In such an embodiment, the judges may specify information about themselves, such as their age and interests. The information that a judge specifies about him or herself is used to set the parameter values of the external features.

When the judgments are submitted, the external feature values that were specified in the controls are stored along with the judgments. During the training phase, when an externally-generated score is fed to the machine learning engine 308, those external feature values are fed into the machine learning engine 308 along with the values for the various frame-specific and video-specific features. As a result, machine learning engine 308 learns how different external feature values affect the perceived quality of candidate images.

Selecting Multiple Representative Images for a Video

After the candidate images for a particular video item have been scored, the candidate images may be ranked based on the scores, and the candidate image with the highest score may be selected as the representative image. The representative image may then be used, for example, in the search results of the video search that triggered the automated representative image selection operation.

Depending on the context for which the representative images are being selected, it may be desirable to select multiple representative images for a single video. For example, a video search service may provide search results in a format that includes three representative images for each video item listed in the search results. As another example, it may be desirable to represent each video item as a slideshow of N representative images from the video item.

In situations where multiple representative images are selected to represent a single video item, the N candidate images with the highest scores may be selected, where N is the number of representative images used to represent the video item. Preferably, the N representative images thus selected would be presented in a sequence that corresponds to their respective positions within the video item, rather than their respective positions within the ranking. Thus, the sequence of the "story" told by the video item would be preserved.

Unfortunately, selecting the N candidate images with the highest scores may result in the selection of very similar images. Therefore, in an alternative embodiment, N scenes from the video are selected based on how high the image candidates from the scenes scored. Once N scenes have been selected, the top-scoring candidate image from each of the N scenes is used as a representative image. This selection process ensures that the representative images come from different scenes of the video, and therefore are less likely to be near duplicates of each other.

Another way to avoid selecting multiple similar representative images for the same video item is to calculate a similarity score between each of the top X candidate images, where X is greater than N (the desired number of representative images). N images may then be chosen from the top X candidate images based on how dissimilar those candidate images are to other candidate images that have already been selected to be representative images.

Improving Results Using Explore/Exploit

It is possible that the training the machine learning engine 308 receives during the training phase is insufficient to produce a machine learning model 310 that always results in selection of the best representative images in the scoring phase. Therefore, according to one embodiment, an explore/exploit process may be followed during which, for the same video items, different users are shown different representative images. For example, the top scoring candidate image (IMG1) for a video may be displayed to 95% of the users, while the second highest scoring candidate image (IMG2) for the same video is displayed to 5% of the users. The behavior of the two sets of users may be monitored. As soon as it becomes clear, based on the behavior of the two groups, that an image other than the highest-ranking image produces better results, then the image that is getting the best results may be established as the new default representative image for the video.

The monitored behavior of users may also be used as the basis for subsequent training phases of the machine learning engine 308. For example, if it turns out that the users that were presented IMG2 watch the video much more frequently than the users that were presented IMG1, then machine learning engine 308 may be trained to score the IMG2 higher than IMG1. These subsequent training operations modify the machine learning model 310, thereby affecting the scores produced by the machine learning engine 308 during subsequent scoring phases.

In addition to comparing user behavior by presenting different high scoring candidate images to different groups, low scoring candidate images may also be tested. For example, a low-scoring candidate image may be used as the representative image for 1% of the users. The behavior of those users may be monitored and compared to the behavior of users exposed to the highest-scored candidate image. The result of that behavior may be translated into a new score for the low-scoring image, which may then be fed into the machine learning engine 308 to refine the machine learning model 310.

As another example, a multi-armed bandit approach may be used in which, for example, 5% of a video search engine's search results are used to test user response to representative images that did not receive the highest model-generated score 312. The results of those tests may be fed back into the machine learning engine 308 to either reinforce or modify the machine learning model 310.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
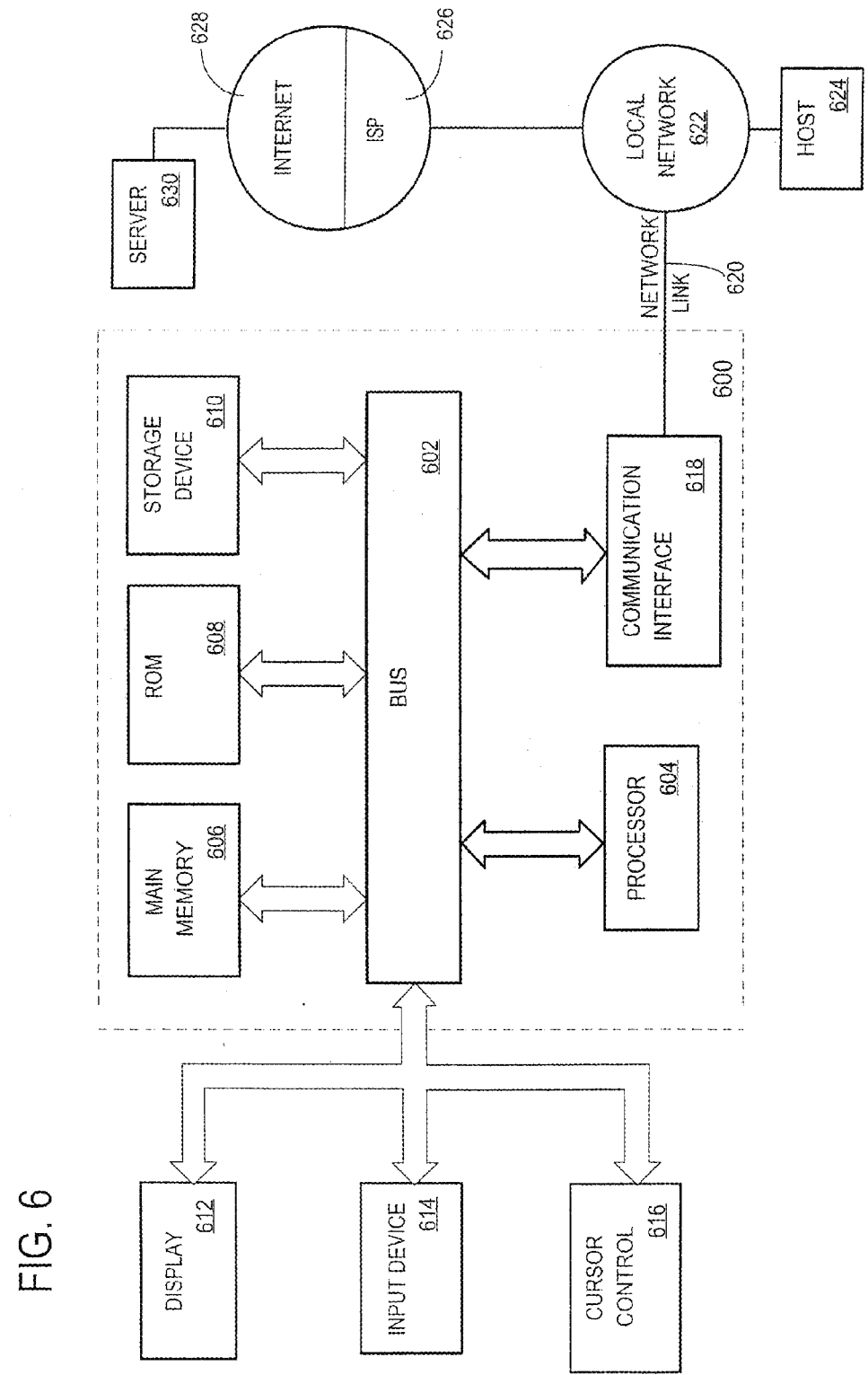
FIG. 6 is a block diagram of a computer system upon which embodiments of the invention may be implemented.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   generating a plurality of model-generated scores;
   wherein each model-generated score of the plurality of model-generated scores corresponds to a candidate image from a plurality of candidate images for a particular video item;
   wherein generating the plurality of model-generated scores includes, for each candidate image of the plurality of candidate images, using a set of input parameter values with a trained machine learning engine to produce the model-generated score that corresponds to the candidate image, wherein the set of input parameter values include at least one input parameter value for an activity feature that reflects one or more actions that one or more users have performed, during playback of the particular video item, relative to a frame that corresponds to the particular candidate image;
   establishing a ranking of the candidate images, from the plurality of candidate images, for the particular video item based, at least in part, on the model-generated scores that correspond to the candidate images;
   selecting a candidate image, from the plurality of candidate images, as a representative image for the particular video item based, at least in part, on the ranking;
   wherein the method is performed by one or more computing devices.

2. The method of claim 1 further comprising automatically selecting the plurality of candidate images for which to generate model-generated scores, by:
   dividing the particular video item into a plurality of scenes by detecting scene boundaries within the particular video item; and
   selecting a particular number of candidate images from each scene from the plurality of scenes.

3. The method of claim 1 wherein using a set of input parameter values with the trained machine learning engine includes using with the trained machine learning engine at least one input parameter for a target-specific feature.

4. The method of claim 3 wherein the target-specific feature is based on behavior information collected about a target user.

5. The method of claim 3 wherein the target-specific feature is based on behavior information collected about users that have been determined to be similar to a target user.

6. The method of claim 1 wherein using a set of input parameter values with the trained machine learning engine includes using with the trained machine learning engine at least one input parameter for one or more of a request-specific feature, a temporal feature, or a naturalness features.

7. The method of claim 1 wherein using a set of input parameter values with the trained machine learning engine for a particular candidate image includes using with into the trained machine learning engine at least one input parameter for an audio feature.

8. The method of claim 1 wherein using a set of input parameter values with the trained machine learning engine for a particular candidate image includes using with the trained machine learning engine at least one input parameter for a feature that reflects how similar the particular candidate image is to images in other video items that belong to a collection to which the particular video item belongs.

9. The method of claim 1 wherein using a set of input parameter values with the trained machine learning engine for a particular candidate image includes using with the trained machine learning engine at least one input parameter for at least one of:
   an orientation feature;
   a contrast feature;
   a saturation feature;
   a brightness feature;
   a sharpness feature;
   a colorfulness feature; or
   a SIFT or SURF feature.

10. The method of claim 1 further comprising employing an explore/exploit technique to test actual user responses to different representative images of the particular video item.

11. The method of claim 10 further comprising training the machine learning engine based, at least in part, on results obtained by employing the explore/exploit technique.

12. One or more non-transitory computer-readable media storing instructions which, when processed by one or more processors, cause:
   generating a plurality of model-generated scores;
   wherein each model-generated score of the plurality of model-generated scores corresponds to a candidate image from a plurality of candidate images for a particular video item;
   wherein generating the plurality of model-generated scores includes, for each candidate image of the plurality of candidate images, using a set of input parameter values with a trained machine learning engine to produce the model-generated score that corresponds to the candidate image, wherein the set of input parameter values include at least one input parameter value for an activity feature that reflects one or more actions that one or more users have performed, during playback of the particular video item, relative to a frame that corresponds to the particular candidate image;
   establishing a ranking of the candidate images, from the plurality of candidate images, for the particular video item based, at least in part, on the model-generated scores that correspond to the candidate images;

selecting a candidate image, from the plurality of candidate images, as a representative image for the particular video item based, at least in part, on the ranking;

wherein the method is performed by one or more computing devices.

13. The one or more non-transitory computer-readable media of claim 12 further comprising additional instructions which, when processed by the one or more processors, causes automatically selecting the plurality of candidate images for which to generate model-generated scores, by:

dividing the particular video item into a plurality of scenes by detecting scene boundaries within the particular video item; and selecting a particular number of candidate images from each of the plurality of scenes.

14. The one or more non-transitory computer-readable media of claim 12 wherein using a set of input parameter values with the trained machine learning engine includes using with the trained machine learning engine at least one input parameter for a target-specific feature.

15. The one or more non-transitory computer-readable media of claim 12 wherein using a set of input parameter values with the trained machine learning engine includes using with into the trained machine learning engine at least one input parameter for a request-specific feature.

16. The one or more non-transitory computer-readable media of claim 12 further comprising additional instructions which, when processed by the one or more processors, causes employing an explore/exploit technique to test actual user responses to different representative images of the particular video item.

17. The one or more non-transitory computer-readable media of claim 16 further comprising additional instructions which, when processed by the one or more processors, causes training the machine learning engine based, at least in part, on results obtained by employing the explore/exploit technique.

18. The one or more non-transitory computer-readable media of claim 16, wherein the set of input parameter values include at least one input parameter value for one or more of a temporal feature, a naturalness feature, or an audio feature.

19. An apparatus comprising:

one or more processors; and one or more memories communicatively coupled to the one or more processors and storing instructions which, when processed by the one or more processors, cause:

generating a plurality of model-generated scores;

wherein each model-generated score of the plurality of model-generated scores corresponds to a candidate image from a plurality of candidate images for a particular video item;

wherein generating the plurality of model-generated scores includes, for each candidate image of the plurality of candidate images, using a set of input parameter values with a trained machine learning engine to produce the model-generated score that corresponds to the candidate image, wherein the set of input parameter values include at least one input parameter value for an activity feature that reflects one or more actions that one or more users have performed, during playback of the particular video item, relative to a frame that corresponds to the particular candidate image;

establishing a ranking of the candidate images, from the plurality of candidate images, for the particular video item based, at least in part, on the model-generated scores that correspond to the candidate images; and selecting a candidate image, from the plurality of candidate images, as a representative image for the particular video item based, at least in part, on the ranking.

20. The apparatus of claim 19, wherein using a set of input parameter values with the trained machine learning engine includes using with the trained machine learning engine at least one input parameter for one or more of a request-specific feature, a temporal feature, or a naturalness features.

\* \* \* \* \*

UNITED STATES PATENT AND TRADEMARK OFFICE
CERTIFICATE OF CORRECTION

PATENT NO. : 9,020,244 B2  
APPLICATION NO. : 13/312558  
DATED : April 28, 2015  
INVENTOR(S) : Roelof van Zwol et al.

Page 1 of 1

It is certified that error appears in the above-identified patent and that said Letters Patent is hereby corrected as shown below:

IN THE CLAIMS

Column 18:

Claim 7, line 16, delete "into"

Column 19:

Claim 15, line 24, delete "into"

Signed and Sealed this
Twentieth Day of October, 2015

Michelle K. Lee
*Director of the United States Patent and Trademark Office*